United States Patent Office 3,487,220
Patented Dec. 30, 1969

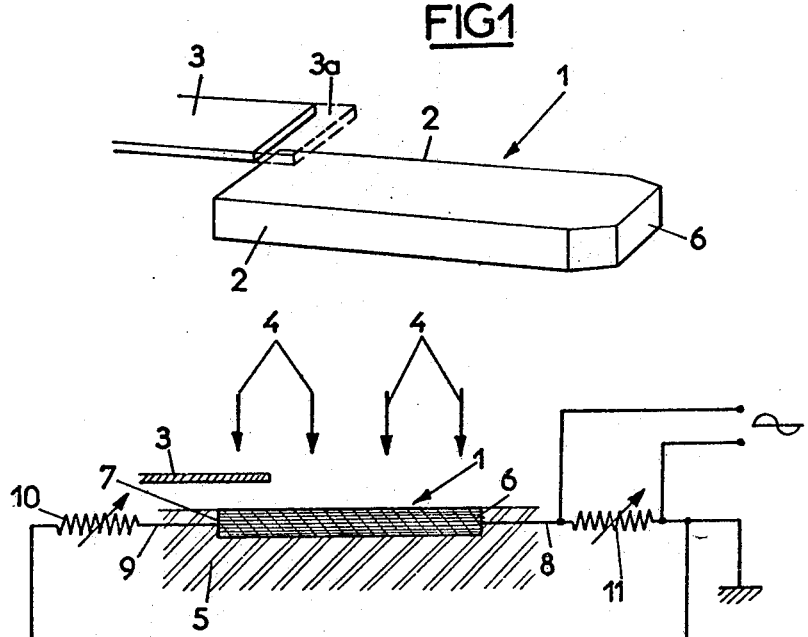
FIG1
FIG2
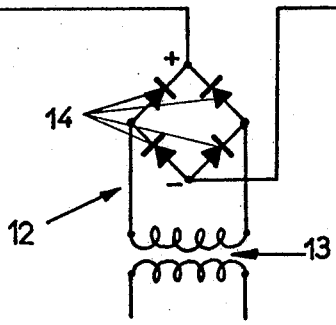
FIG3
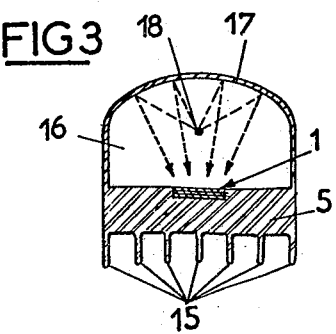
FIG4
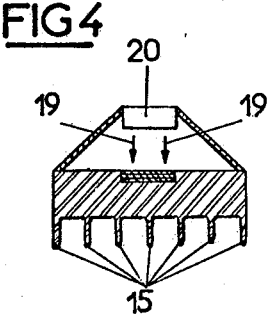
INVENTORS
F.CH. BUCHY
P. G. BAUDUIN
ATTORNEY

3,487,220
DEVICE FOR THE DETECTION AND MEASUREMENT OF VERY SMALL DISPLACEMENTS BY CONVERTING THE SAID DISPLACEMENTS INTO VARIABLE FREQUENCY OSCILLATIONS
Francois Ch. Buchy, Fontenay-aux-Roses, and Philippe G. Bauduin, Caen, France, assignors to Laboratoire Central des Industries Electriques, Fontenay-aux-Roses, France
No Drawing. Filed July 3, 1967, Ser. No. 650,826
Claims priority, application France, July 4, 1966, 68,101
Int. Cl. H01j 39/12, 3/14
U.S. Cl. 250—211        8 Claims

ABSTRACT OF THE DISCLOSURE

A device for the detection and the measurement of the small displacements of a moving object in which a photoresistive and piezoelectric semi-conductive crystal is illuminated by a source of light arranged to irradiate at least one face of the crystal. A D.C. source of stabilized voltage is connected to two contacts provided on the faces of the crystal located on either sides of the irradiated face. There is provided an output circuit which comprises at least one impedance for the measurement of the frequency of the oscillations of the current flowing through the crystal and a mask is also provided to vary the amount of irradiated surface of the crystal, the said mask being mounted for displacement with the moving object.

---

The present invention relates to a new device to detect and to measure very small displacements for eventual use in high precision controls. The said device is characterized by the fact that a mask, solid with the object of which the displacement is to be measured, is disposed across the path of a portion of a luminous flux irradiating one face of a photoresistive and piezoelectric semi-conductive crystal of a particular type supplied with a fixed D.C. voltage and which, according to the value of the luminous flux that it receives, generates oscillations in its own supply circuit, the frequency of the oscillations varying in important proportions.

A semi-conductor of this type, having the required properties, is constituted by cadmium sulfide corresponding to the formula CdS, used in monocrystalline form.

It is known that such a body crystallizes in the hexagonal system.

By irradiating a portion of one face of such a crystal parallel to the hexagon of the crystalline system and by applying to this crystal a D.C. voltage through two electrodes preferably oriented parallel to the mean direction of the luminous irradiation flux, it has been observed that high frequency oscillations are generated in the D.C. supply circuit.

Two variable resistances, that can particularly adapt the impedance of the oscillating circuit to that of the said D.C. source, are generally provided in the respective circuits for the connection of the two electrodes of the D.C. source, the negative electrode of which is preferably grounded.

It is then possible to collect a HF voltage across the terminals of one of the resistances. The said oscillations can also be eventually collected across the terminals of the secondary of a transformer or of an autotransformer in which the primary is inserted in the D.C. supply circuit of the said crystal.

When an optical mask, solid with the object of which the displacement is to be detected and measured, is disposed across the path of the luminous rays, in such a manner as to hide a portion of the crystalline face subjected to the action of the said luminous rays, it is observed that an oscillation frequency of say 1 mHz., generated for a certain position of the said mask, is reduced to 450 kHz. for a displacement of the mask of 0.5 mm. in a direction parallel to the said crystalline face.

The amplitude of the oscillations that can be picked up by supplying such a crystal with 400 D.C. volts is in the order of 10 ma.

It is obvious that independently of the position of the mask, the frequency of the generated oscillations varies also as a function of the smaller or larger value of the D.C. voltage applied across the crystal according to its length and as a function of the maximum intensity of the luminous flux to which this crystalline face may be subjected in the absence of all interception of the rays by a mask.

A variation in the ambient temperature also gives rise to variations in the frequency of the generated oscillations.

The device must therefore be used in a thermostated chamber and the supply voltages of the crystal and of the luminous source must also be stabilized.

Such a device may for instance have a source of white light having a temperature in the order of 2000° C. making it possible to obtain a luminous flux in the order of 0.5 to 0.6 milliwatt per $mm.^2$ of irradiated crystalline face.

The contacts that ensure the junction between the crystal and the D.C. source are obtained by providing, on each of the extreme faces of the said crystal, a coating preferably constituted by two superimposed layers, namely an indium layer directly applied on the crystal and a second layer constituted by an indium-gallium eutectic, in such a manner as to avoid any rectifying effect capable of hindering the passage of the HF oscillations that are to be collected and to be used, for instance, to obtain a high precision control.

The lighted crystal surface is generally of rectangular shape as well as the mask which is displaced in a direction parallel to the two parallel sides of the rectangle.

However, it has been observed that, on the side of the negative electrode connected to ground, it was of interest to obtain a concentration of the continuous flux to facilitate the start of the HF oscillations. The crystal may therefore conveniently be truncated on the side of the negative electrode.

In the case of a white light luminous flux, generated by a filament that is parallel to one of the edges of the mask, this flux is generally concentrated on the crystal by means of a mirror, the filament being then enclosed within a tight chamber overlying the crystal to be irradiated and in which vacuum has been achieved.

The semi-conductive element is disposed on an insulating base preferably made of beryllium oxide. Extending across the base are the conductors that make the connection between the contacts provided at the extreme end of the said crystal and the two electrodes of the said D.C. source.

Furthermore, fins for thermal evacuation are provided on this beryllium oxide base, on the side thereof opposite the said mirror and the said tight chamber.

In another embodiment, a green light or a light having a shorter wavelength is used, the light being emitted by polarized luminescent diodes of the p-n type.

It is then sufficient to provide a flux in the order of 0.1 millwatt per $mm.^2$ of the irradiated crystalline face.

As semi-conductive crystal, use may be made for instance of a crystal having a length in the order of 5 mm. between its two feed contacts, a width in the order of 1 mm. and a thickness in the order of 0.5 mm.

When it is necessary to have a concentration of the field on the side of the negative electrode, a truncation in the order of 10% on each side may be provided, that is, reducing the length of the two linear parallel portions of the crystal to 4 mm. and the width of the said crystal to 0.8 mm.

The photoconductive effect of such a crystal is very clear since its resistance, when it is not lighted, is approximately 100 times greater than when it is lighted by a luminous flux corresponding to the values indicated above.

Furthermore, the frequency of the oscillations generated in such a crystal may vary from single to double for a displacement of the optical mask of 0.5 mm., for instance from 0.5 mHz. to 1 mHz.

Since it is presently possible to easily detect frequency variations smaller than 1 Hz. for frequencies in the order of 1 mHz., it becomes possible to measure displacements in the order of $2/1000$ micron that may, for instance, correspond to expansion phenomena or to the deformation of a membrane or of a slightly elastic wall of a chamber.

It is possible to detect and measure displacement sin the order of $2/1000$ micron with comparators based on this principle whereas comparators of the conventional type will allow measurements of displacements that are at best equal to $1/10$ micron.

It is equally possible with such comparators to detect and measure alternative displacements such as those due to periodic stresses or to vibrations.

The device may finally be used to obtain high precision controls by using appropriate electronic assemblies capable of converting the very small displacements of the said optical mask that can be tolerated when the control is suitably made, into variations of a magnitude of appropriate type, capable of compensating for the larger displacements of the aforesaid mask which would be obtained in the absence of controls.

In the case of displacements caused by expansion, the frequency variations may for instance be converted into variations in the flow of the fluid which serves to cool the object of which the expansion is to be controlled.

Controls may thus easily be obtained that correspond to a maximum displacement of $1/100$ micron.

Comparators made according to the invention may also be used as seismographs for the measurement of small earth tremors by using, in a manner known per se, high inertia pendulums incapable of following the earth tremors at the speed of the tremors and supporting the aforementioned semi-conductive crystal whereas the mask is directly solid with the earth subjected to the tremors.

The features of the present invention will be best understood from the following description of various embodiments given by way of non-limitative examples and described by reference to the appended drawing wherein:

FIGURE 1 is a schematic perspective view illustrating the respective positions of a crystal of the truncated type on the side of the negative electrode and of a mask movable parallel to the said crystal;

FIGURE 2 is an electrical diagram illustrating the D.C. supply of the said crystal and the circuit used for collecting the variable frequency oscillations generated in the crystal;

FIGURE 3 is a vertical cross-sectional view of a device for the irradiation of a crystal in white light from a filament enclosed in a tight chamber under vacuum;

FIGURE 4 is a vertical cross-sectional view of an embodiment of the device of FIGURE 3 using a parallel luminous flux in green light or of a lower wavelength, by electro-luminescent diodes, the beam being directed perpendicularly to the plane of the hexagon of the crystal lattice.

In FIGURE 1, the semi-conductive crystal 1 comprises two long parallel sides 2 having, for instance, a length in the order of 4.5 mm., the width of the crystal between sides 2 being in the order of 1 mm. whereas its thickness is in the order of 0.5 mm.

The mask 3, also shown in broken lines at 3a, has a width of the same order as that of crystal 1, that is, in the order of 1 mm., and moves parallel to sides 2 in such manner as to prevent the luminous flux from reaching the surface of the crystal on a portion of its length which may be comprised, for instance, between 0.5 mm. and 1 mm. according to whether the mask is in position 3 or in position 3a.

On the diagram of FIGURE 2, the luminous irradiation flux corresponding to the parallel arrows 4 has been illustrated as perpendicular to the face of the crystal 1, but, as indicated previously, it is not necessary to light the crystal in parallel light.

The crystal is embedded in an insulating base 5 that can be made of beryllium oxide.

The truncation of the side of the negative electrode of FIGURE 1 is in the order of 10% in the two dimensions, which means that the length of the non-truncated portion is 5 mm., whereas that of the truncated portion is reduced to 4.5 mm., and that the width of the crystal at the level of the two truncations is thus reduced by 0.8 mm.

The contact 6 for connection with the negative electrode is constituted, as is the contact 7 for connection with the positive electrode, by twostacked layers one of indium and one of an indium-gallium eutectic.

The conductors 8 and 9 for connection to the D.C. source are sunk in the insulating base 5.

Two adjustable resistances are inserted between the two negative and positive poles of the said D.C. source, as previously indicated.

The negative pole of source 11 is connected to ground and the adjustment of the two resistances 10 and 11 makes it possible to adapt the impedance HF of the load circuit to that of the D.C. source 12, source which is constituted in FIGURE 2 by a transformer 13 and an assembly of bridge-mounted rectifying cells 14.

In FIGURE 3, the beryllium base is again shown at 5 and the crystal at 1.

The beryllium base is provided at the bottom thereof with fins 15 for the evacuation of the heat generated by the passage of the various D.C. and mf. currents in the aforesaid crystal.

In FIGURE 3, above the crystal, is provided a tight chamber 16 defined in its upper portion by a mirror 17 which serves to concentrate, on the surface of the semi-conductive crystal 1, the rays emitted by a filament 18.

Vacuum is obtained within chamber 16 and, furthermore, the temperature of crystal 1 may for instance be adjusted by varying, by means of a thermostat, the flow of a cooling fluid in contact with the fins 15.

As indicated previously, it is also necessary to accurately adjust the value of the supply voltage of filament 18 and also that of the D.C. voltage supplied by source 12.

Now with reference to FIGURE 4, it can be seen that a parallel luminous flux of green light or of a shorter wave length, corresponding to arrows 19, is emitted by a polarized electroluminescent diode 20 of the p-n type.

It is to be understood that various modifications, improvements or additions may be made to the embodiment described or that certain equivalent elements may be replaced without departing from the spirit of the invention.

We claim:

1. A device for detecting and measuring small displacements of a moving object comprising, in combination:
   (a) a photoresistive and piezoelectric semi-conductive crystal;
   (b) a stabilized luminous source arranged to irradiate at least one face of the said crystal;
   (c) two contacts provided on the faces of the said crystal located on either side of the irradiate face;
   (d) a source of stabilized D.C. voltage having a negative and positive pole connected to the said contacts;
   (e) an output circuit including at least one impedance for the measurement of the frequency of the oscillation of the current flowing through the crystal, the frequency of which is a function of the said irradiate face;

(f) means to vary the irradiated surface of the said crystal, the said means being mounted for displacement with the moving object.

2. A device as claimed in claim 1, wherein the said means is a mask displaceable relative to said irradiated surface in a plane parallel to the said irradiated surface from a point adjacent to the one of said two contacts connected to the positive pole of said source of D.C. voltage.

3. A device as claimed in claim 1, wherein said luminous source irradiating the crystal is a white light source providing, on the illuminated face of the said crystal, a degree of illumination corresponding approximately to 0.5 or 0.6 milliwatt per mm.$^2$ of irradiated surface.

4. A device as claimed in claim 1, wherein the luminous source irradiating the crystal is constituted by an electroluminescent diode emitting a green light or of a smaller wavelength.

5. A device as claimed in claim 1, wherein said crystal is made of cadmium sulfide corresponding to the formula CdS in monocrystalline form.

6. A device as claimed in claim 1, wherein said crystal is substantially parallelepipedic and is formed with a decreasing cross-section adjacent the one of said two contacts connected to the negative pole of the D.C. voltage source.

7. A device as claimed in claim 6, wherein at least two sides of the crystal at the one end having a decreasing cross-section are obliquely cut off.

8. A device as claimed in claim 1, wherein the source of D.C. voltage is of at least 400 volts for a crystal having a distance of 5 mm. between contacts.

References Cited

UNITED STATES PATENTS

| | | | |
|---|---|---|---|
| 2,706,791 | 4/1955 | Jacobs et al. | 250—211 X |
| 2,975,377 | 3/1961 | Price et al. | 331—115 X |
| 3,064,132 | 11/1962 | Strull | 331—66 X |
| 3,253,153 | 5/1966 | Stoddard | 250—231 X |

RALPH G. NILSON, Primary Examiner

T. N. GRIGSBY, Assistant Examiner

U.S. Cl. X.R.

250—206, 212, 237; 331—66, 115, 154; 333—80